US010192347B2

(12) United States Patent
Bui et al.

(10) Patent No.: US 10,192,347 B2
(45) Date of Patent: Jan. 29, 2019

(54) 3D PHOTOGRAMMETRY

(71) Applicant: VanGogh Imaging, Inc., McLean, VA (US)

(72) Inventors: Huy Bui, McLean, VA (US); Ken Lee, Fairfax, VA (US); Jun Yin, McLean, VA (US)

(73) Assignee: VanGogh Imaging, Inc., McLean, VA (US)

( * ) Notice: Subject to any disclaimer, the term of this patent is extended or adjusted under 35 U.S.C. 154(b) by 53 days.

(21) Appl. No.: 15/596,590

(22) Filed: May 16, 2017

(65) Prior Publication Data
US 2017/0337726 A1 Nov. 23, 2017

Related U.S. Application Data

(60) Provisional application No. 62/337,808, filed on May 17, 2016.

(51) Int. Cl.
*G06K 9/00* (2006.01)
*G06T 15/04* (2011.01)
(Continued)

(52) U.S. Cl.
CPC .............. *G06T 15/04* (2013.01); *G06T 5/003* (2013.01); *G06T 7/97* (2017.01); *G06T 17/20* (2013.01);
(Continued)

(58) Field of Classification Search
CPC ........... G06T 15/04; G06T 19/20; G06T 7/97; G06T 5/003; G06T 17/10; G06T 17/20;
(Continued)

(56) References Cited

U.S. PATENT DOCUMENTS 6,275,235 B1 * 8/2001 Morgan, III ............ G06T 15/04
345/582
8,542,233 B2 * 9/2013 Brown .................. G06T 11/001
345/428
(Continued)

OTHER PUBLICATIONS

Liu et al., Creating Simplified 3D Models with High Quality Textures, 2016, arXiv.*

*Primary Examiner* — John Strege
(74) *Attorney, Agent, or Firm* — Proskauer Rose LLP

(57) ABSTRACT

Described herein are methods and systems for texturing a three-dimensional (3D) model using photogrammetry. A sensor captures scans of a physical object, including related pose information, and color images corresponding to each scan. A computing device generates a 3D mesh of the physical object. The computing device preprocesses the color images to remove blurry images and detect textured regions of the object in each non-blurry image. The computing device optimizes the pose information for each color image by generating associations between the color images and vertices in the 3D mesh and classifying the vertices as textured or non-textured. The computing device generates texture coordinates for the 3D mesh by segmenting the mesh, parameterizing the segments, and packing the parameterized segments into a texture atlas. The computing device paint the texture atlas using the color images that have optimized pose information to generate a model having texture coordinates for each vertex.

22 Claims, 12 Drawing Sheets

(51) Int. Cl.
*G06T 7/00* (2017.01)
*G06T 5/00* (2006.01)
*G06T 17/20* (2006.01)

(52) U.S. Cl.
CPC ............ *G06T 2200/04* (2013.01); *G06T 2207/10024* (2013.01); *G06T 2207/20028* (2013.01); *H05K 999/99* (2013.01)

(58) Field of Classification Search
CPC ......... G06T 2219/2012; G06T 2200/04; G06T 2207/10024; G06T 2207/20028; G06T 2207/2004
See application file for complete search history.

(56) References Cited

U.S. PATENT DOCUMENTS

| | | | | |
|---|---|---|---|---|
| 9,041,711 B1* | 5/2015 | Hsu | .................. | G06T 17/20 345/420 |
| 9,171,402 B1* | 10/2015 | Allen | .................. | G06T 17/05 |
| 9,607,388 B2* | 3/2017 | Lin | .................. | H04N 13/221 |
| 2006/0170695 A1* | 8/2006 | Zhou | .................. | G06T 15/04 345/582 |
| 2015/0142394 A1* | 5/2015 | Mehr | .................. | G06F 17/50 703/1 |
| 2015/0213572 A1* | 7/2015 | Loss | .................. | G06T 7/12 345/420 |
| 2015/0269715 A1* | 9/2015 | Jeong | .................. | G06T 11/001 345/582 |
| 2015/0325044 A1* | 11/2015 | Lebovitz | .................. | G06T 15/04 345/420 |
| 2016/0171765 A1* | 6/2016 | Mehr | .................. | G06F 17/11 345/419 |
| 2017/0221263 A1* | 8/2017 | Wei | .................. | G06T 15/04 |
| 2017/0278293 A1* | 9/2017 | Hsu | .................. | G06T 11/001 |
| 2017/0316597 A1* | 11/2017 | Ceylan | .................. | G06T 15/04 |
| 2018/0025529 A1* | 1/2018 | Wu | .................. | A61B 5/0088 345/426 |
| 2018/0144535 A1* | 5/2018 | Ford | .................. | G06T 15/005 |

* cited by examiner

3D PHOTOGRAMMETRY

RELATED APPLICATIONS

This application claims priority to U.S. Provisional Patent Application No. 62/337,808, filed May 17, 2016, the entirety of which is incorporated herein by reference.

TECHNICAL FIELD

The subject matter of this application relates generally to methods and apparatuses, including computer program products, for texturing a three-dimensional (3D) model using photogrammetry.

BACKGROUND

Generally, the visual quality of 3D models created by handheld scanning software can vary. For example, the vertex color given by directly raycasting a fused volumetric model can be blurry due to the averaging nature of the fusing process. In some instances, better results can be obtained by reconstructing the color of the vertices using captured color images and optimizing the poses with photogrammetry-based bundle adjustment techniques. However, the rendered images are still blurry when viewing them at close distances because the color of each pixel inside a fragment is interpolated from the color at the corner vertices.

SUMMARY

Therefore, what is needed is an approach that incorporates standard texture mapping technique with photogrammetric bundle adjustment. Using the photogrammetry texturing techniques described herein, a high-quality texture atlas is generated together with the 3D model, allowing for photorealistic rendering of the reconstructed 3D model.

The techniques described herein provide certain advantages over current handheld scanning techniques, such as:

The reconstructed model is output as an .OBJ file with color per vertex; the photogrammetry technique described herein outputs the reconstructed model as three files: an .OBJ file with texture coordinates per vertex, an .MTL file specifying the texture atlas and a texture atlas as a .BMP file.

The reconstructed model is represented as a triangular mesh. In prior techniques, the color at a point inside a face is interpolated from the color of three vertices of the face, which leads to blurry result when viewing the model at close distance—especially when an edge passes through the face. Using the techniques described herein, each point inside a face has texture coordinates interpolated from those of the three vertices. The texture coordinates of the point are used to look up its color from the texture map. There is no interpolation of color.

Color images are automatically captured during the object capturing process. It is possible to control how frequent the images are captured by specifying the minimum rotation angle between images.

The pixels related to a user's hands in the input color images can be cropped automatically to reduce artifacts in the results, through exploiting information obtained from the image capture software.

Instead of using an optimized vertex color as output, the techniques described herein output a texture-mapped model with a high-quality texture atlas.

The invention, in one aspect, features a computerized method of texturing a three-dimensional (3D) model using photogrammetry. A 3D sensor coupled to a computing device captures one or more 3D scans of a physical object in a scene, including related pose information of the object, and one or more color images corresponding to each 3D scan. The computing device generates a 3D mesh of the physical object using the 3D scans and pose information. The computing device preprocesses the color images to remove blurry images and to detect textured regions of the object in each non-blurry image. The computing device optimizes the pose information for each color image by generating associations between the color images and vertices in the 3D mesh and classifying the vertices as textured or non-textured. The computing device generates texture coordinates for the 3D mesh by segmenting the 3D mesh, parameterizing the segments, and packing the parameterized segments into a texture atlas. The computing device paints the texture atlas using the color images that have optimized pose information to generate a 3D model having texture coordinates for each vertex.

The invention, in another aspect, features a system for texturing a three-dimensional (3D) model using photogrammetry. The system comprises a 3D sensor coupled to a computing device. The 3D sensor captures one or more 3D scans of a physical object in a scene, including related pose information of the object, and one or more color images corresponding to each 3D scan. The computing device generates a 3D mesh of the physical object using the 3D scans and pose information. The computing device preprocesses the color images to remove blurry images and to detect textured regions of the object in each non-blurry image. The computing device optimizes the pose information for each color image by generating associations between the color images and vertices in the 3D mesh and classifying the vertices as textured or non-textured. The computing device generates texture coordinates for the 3D mesh by segmenting the 3D mesh, parameterizing the segments, and packing the parameterized segments into a texture atlas. The computing device paints the texture atlas using the color images that have optimized pose information to generate a 3D model having texture coordinates for each vertex.

Any of the above aspects can include one or more of the following features. In some embodiments, capturing one or more 3D scans of a physical object in a scene comprises one or more of: bilateral filtering of the one or more 3D scans to remove noise; downsampling the one or more 3D scans to generate an image pyramid at different scales; converting the one or more 3D scans to 3D point clouds and estimating the normal vector for each vertex in the point clouds; and cropping points outside the scan volume. In some embodiments, capturing one or more 3D scans of a physical object in a scene comprises, for each of the one or more 3D scans: registering the 3D scan to a current volumetric model of the object; updating the current volumetric model based upon a current pose of the object in the 3D scan; determining, based upon the current pose, whether the object has rotated more than a specified threshold from a previous pose; and capturing a high-resolution color image of the object and a pose of the object when the object has rotated more than the specified threshold.

In some embodiments, preprocessing the color images to remove blurry images comprises: generating a blur metric for each color image; determining whether the blur metric is below a predetermined threshold; and removing the color image when the blur metric is below the predetermined threshold. In some embodiments, preprocessing the color images to detect textured regions of the object comprises: classifying pixels in each non-blurry color image as textured or non-textured; and generating a binary mask for each non-blurry color image that specifies whether each pixel in the image is textured or non-textured.

In some embodiments, generating associations between the color images and vertices in the 3D mesh comprises: generating a first list of vertices per color image, wherein the first list comprises vertices visible in the color image; and generating a second list of images per vertex, wherein the second list comprises images that include the vertex. In some embodiments, optimizing the pose information for each color image comprises minimizing, by the computing device, a cost function. In some embodiments, minimizing the cost function comprises alternately updating a pose of each vertex and a color of each vertex.

In some embodiments, segmenting the 3D mesh comprises segmenting the 3D mesh into regions isomorphic to a disk. In some embodiments, parameterizing the segments comprises assigning 2D texture coordinates to each vertex inside each region.

In some embodiments, the computing device overlays a first one of the captured color images onto the 3D mesh of the object using the pose information of the 3D scan corresponding to the color image; generates a different first color image by capturing the first color image and a geometry of the 3D mesh from a perspective of the pose information of the 3D scan corresponding to a second one of the captured color images; stretches the second color image to align with the different first color image, using the different first color image as an anchor; and repeats the overlaying step, the generating a different color image step, and the stretching step for each of the captured color images until all of the captured color images are aligned.

Other aspects and advantages of the invention will become apparent from the following detailed description, taken in conjunction with the accompanying drawings, illustrating the principles of the invention by way of example only.

DETAILED DESCRIPTION

Figure 1:
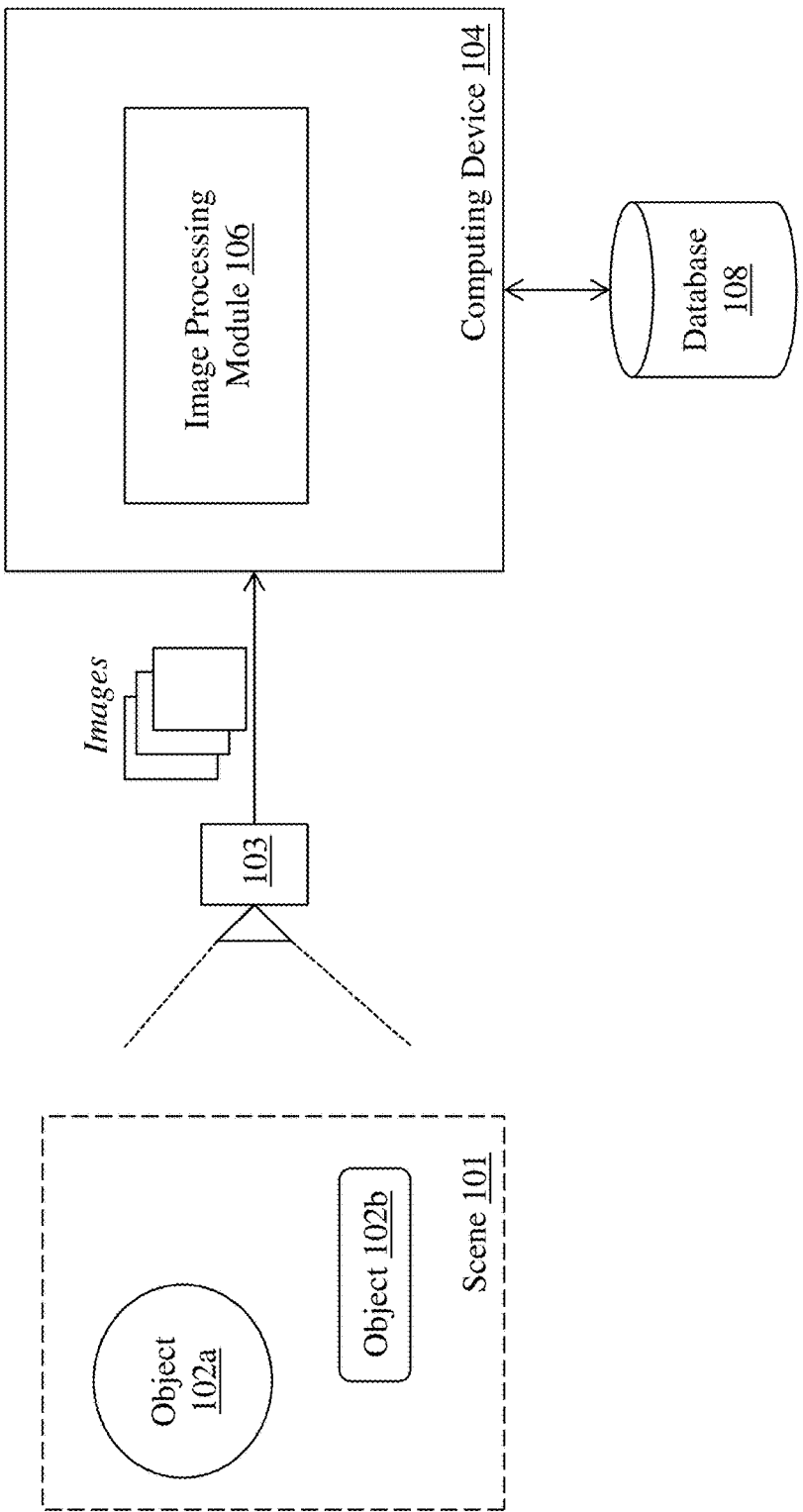
FIG. 1 is a block diagram of a system for generating a three-dimensional (3D) model of an object represented in a scene.

FIG. 1 is a block diagram of a system 100 for generating a three-dimensional (3D) model of an object represented in a scene. The systems and methods described in this application utilize the object recognition and modeling techniques as described in U.S. patent application Ser. No. 14/324,891, titled "Real-Time 3D Computer Vision Processing Engine for Object Recognition, Reconstruction, and Analysis," and as described in U.S. patent application Ser. No. 14/849,172, titled "Real-Time Dynamic Three-Dimensional Adaptive Object Recognition and Model Reconstruction," both of which are incorporated herein by reference. Such methods and systems are available by implementing the Starry Night plug-in for the Unity development platform, available from VanGogh Imaging, Inc. of McLean, Va.

The system includes a sensor 103 coupled to a computing device 104. The computing device 104 includes an image processing module 106. In some embodiments, the computing device can also be coupled to a data storage module 108, e.g., used for storing certain 3D models, color images, and other data as described herein.

The sensor 103 is positioned to capture images (e.g., color images) of a scene 101 which includes one or more physical objects (e.g., objects 102a-102b). Exemplary sensors that can be used in the system 100 include, but are not limited to, 3D scanners, digital cameras, and other types of devices that are capable of capturing depth information of the pixels along with the images of a real-world object and/or scene to collect data on its position, location, and appearance. In some embodiments, the sensor 103 is embedded into the computing device 104, such as a camera in a smartphone, for example.

The computing device 104 receives images (also called scans) of the scene 101 from the sensor 103 and processes the images to generate 3D models of objects (e.g., objects 102a-102b) represented in the scene 101. The computing device 104 can take on many forms, including both mobile and non-mobile forms. Exemplary computing devices include, but are not limited to, a laptop computer, a desktop computer, a tablet computer, a smart phone, augmented reality (AR)/virtual reality (VR) devices (e.g., glasses, headset apparatuses, and so forth), an internet appliance, or the like. It should be appreciated that other computing devices (e.g., an embedded system) can be used without departing from the scope of the invention. The mobile computing device 102 includes network-interface components to connect to a communications network. In some embodiments, the network-interface components include components to connect to a wireless network, such as a Wi-Fi or cellular network, in order to access a wider network, such as the Internet.

The computing device 104 includes an image processing module 106 configured to receive images captured by the sensor 103 and analyze the images in a variety of ways, including detecting the position and location of objects represented in the images and generating 3D models of objects in the images. The image processing module 106 also performs the post-processing steps for 3D photogrammetry as described in detail below.

The image processing module 106 is a hardware and/or software module that resides on the computing device 104 to perform functions associated with analyzing images capture by the scanner, including the generation of 3D models based upon objects in the images. In some embodiments, the functionality of the image processing module 106 is distributed among a plurality of computing devices. In some embodiments, the image processing module 106 operates in conjunction with other modules that are either also located on the computing device 104 or on other computing devices coupled to the computing device 104. An exemplary image processing module is the Starry Night plug-in for the Unity engine or other similar libraries, available from VanGogh Imaging, Inc. of McLean, Va. It should be appreciated that any number of computing devices, arranged in a variety of architectures, resources, and configurations (e.g., cluster computing, virtual computing, cloud computing) can be used without departing from the scope of the invention.

The data storage module 108 is coupled to the computing device 104, and operates to store data used by the image processing module 106 during its image analysis functions. The data storage module 108 can be integrated with the server computing device 104 or be located on a separate computing device.

Figure 2:
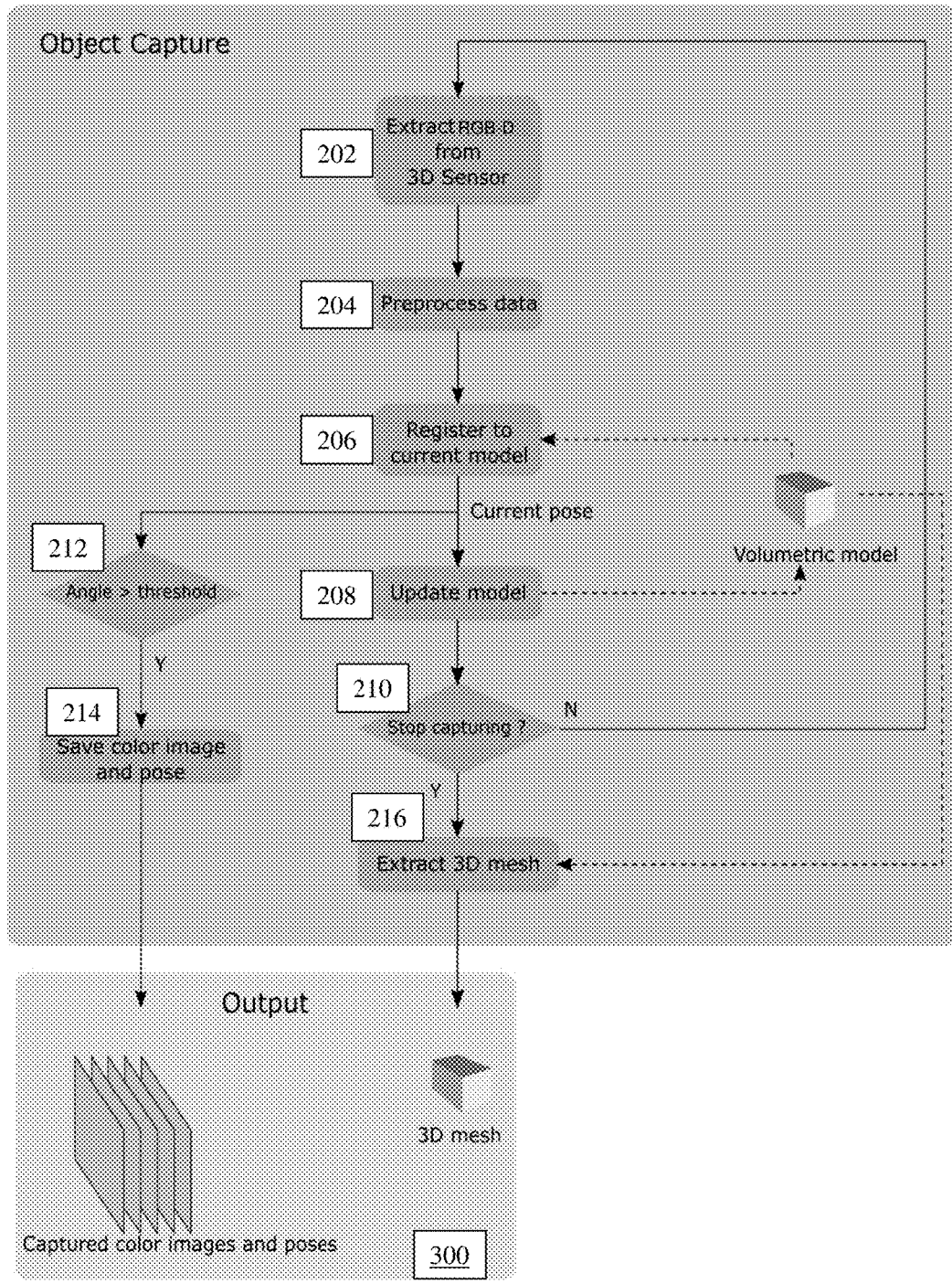
FIG. 2 is a flow diagram of a method of capturing 3D scans of an object in conjunction with high-resolution color images of the object.

FIG. 2 is a flow diagram of a method 200 for capturing 3D scans of an object in conjunction with high-resolution color images of the object, using the system 100 of FIG. 1. As shown in FIG. 2, the sensor 103 captures (202) one or more 3D scans (e.g., pairs of color-depth (RGB-D) images) of a scene 101 which includes object 102a. The image processing module 106 at computing device 104 receives and pre-processes (204) the scan(s). For example, the pre-processing can include, but is not limited to: bilateral filtering of the input depth images to remove noise, downsampling the depth images to generate an image pyramid at different scales, converting the depth images to 3D point clouds, estimating the normal vector for each vertex, and cropping points outside the scan volume.

The module 106 then registers (206) the scan to the current volumetric model of the object (e.g., as determined by the module 106 based upon prior scans). Next, based upon the current pose of the object in the current 3D scan, the module 106 updates (208) the volumetric model. If the image processing module 106 determines (210) that additional scans should be captured by the sensor 103, the module 106 instructs the sensor 103 to capture another scan and performs the pre-processing and registration steps 202-208.

At the same time as the image processing module 106 updates the volumetric model of the object, the module 106 determines (212), based upon the current pose information for the object, whether the object has been rotated more than a specified angle (e.g., fifteen degrees) from any previous captured pose (also referred to as a threshold). If so, the module 106 instructs the sensor 103 to capture (214) a high-resolution color image of the object for storage, and the corresponding pose information is also stored for the post-processing method described below with respect to FIG. 3.

Once the image processing module 106 determines (210) that no further scans are to be captured, the module 106 extracts (216) a 3D mesh of the object from the volumetric model, and imports the 3D mesh and captured color images and pose information as input to the post-processing method 300.

Figure 3:
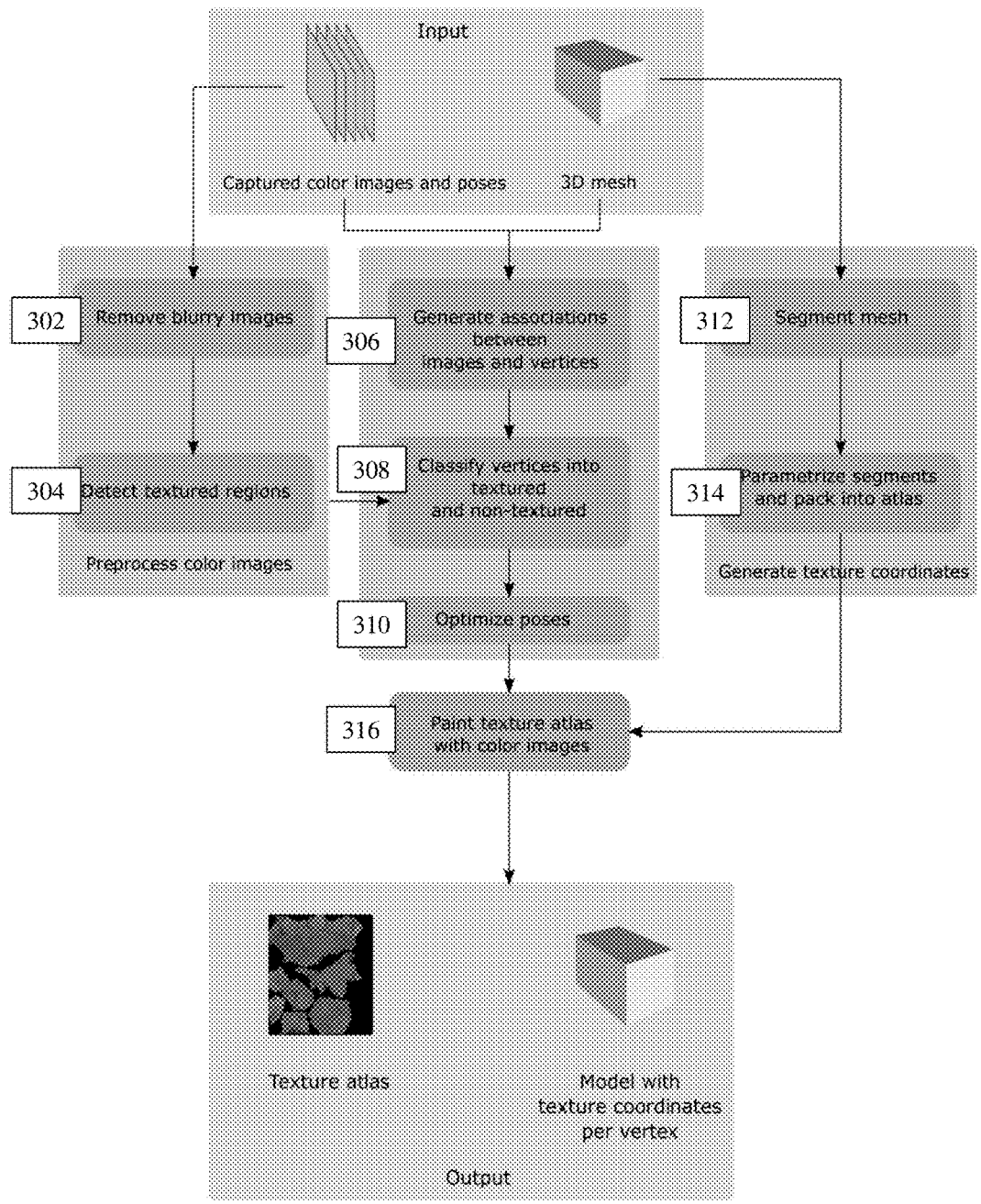
FIG. 3 is a flow diagram of a method of post-processing the 3D mesh and captured color images and pose information using 3D photogrammetry techniques.
Figure 4:
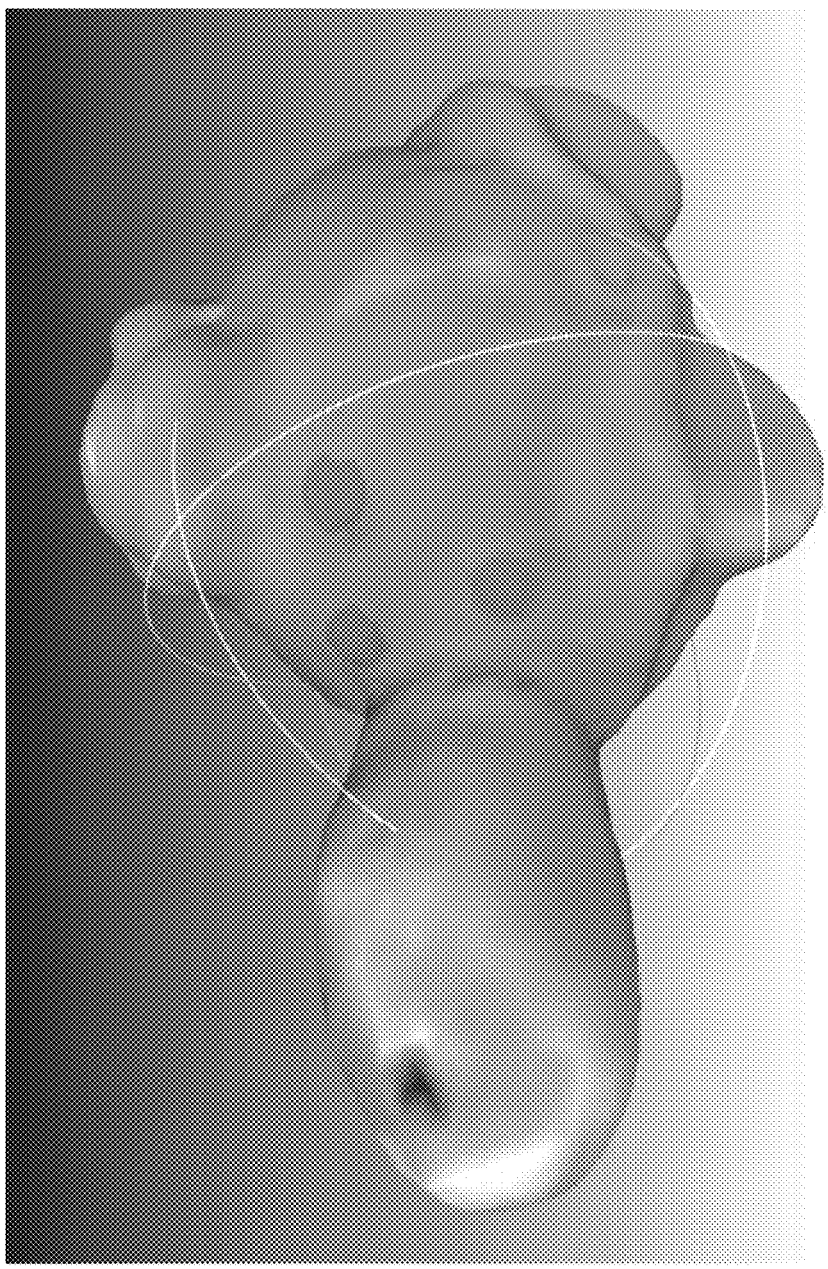
FIG. 4 is an exemplary input 3D mesh of an object.
Figure 5A:
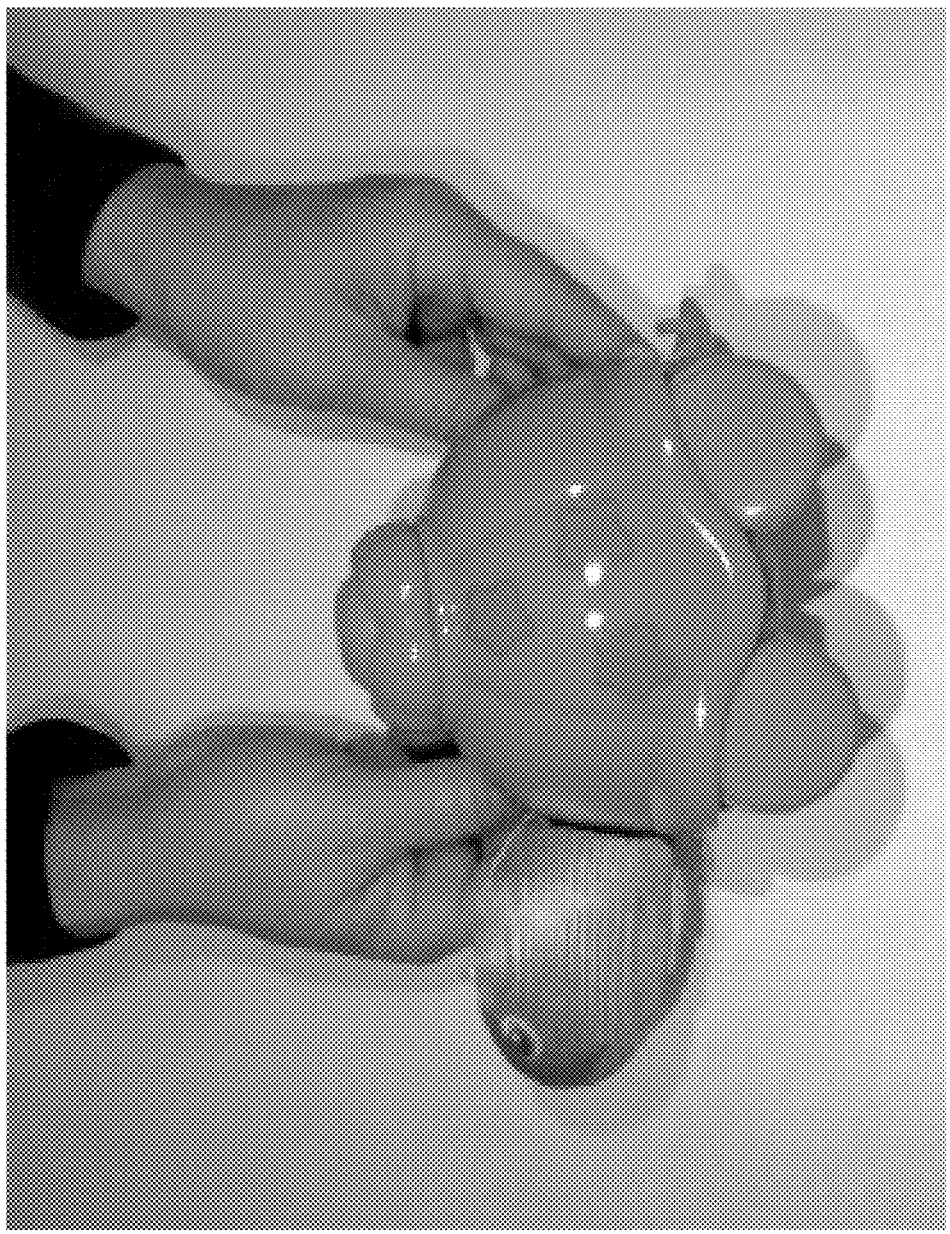
FIGS. 5A to 5C are exemplary input color images.
Figure 5B:
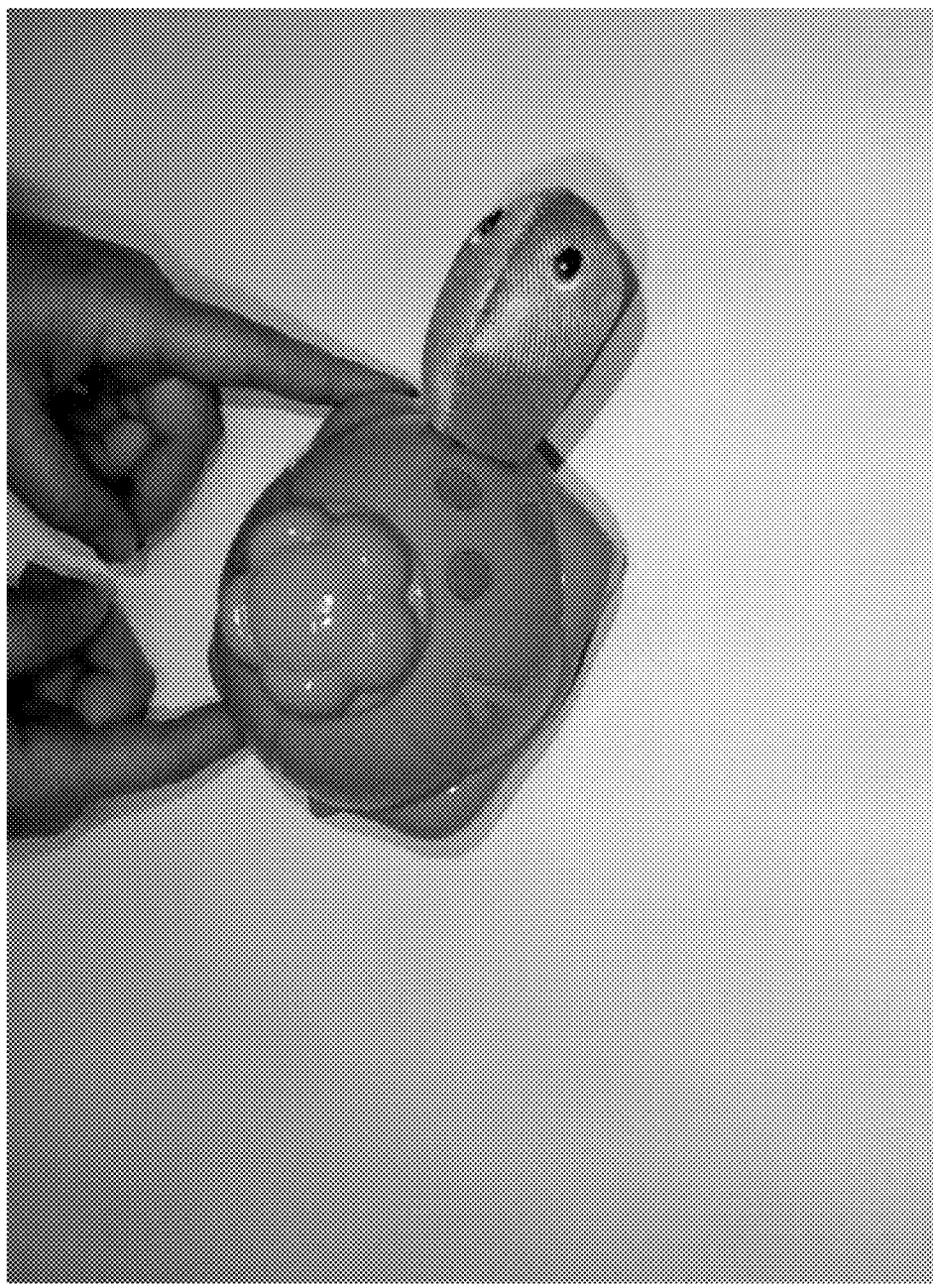
Figure 5C:

FIG. 3 is a flow diagram of a method 300 for post-processing the 3D mesh and captured color images and pose information using 3D photogrammetry techniques, using the system 100 of FIG. 1. As shown in FIG. 3, the image processing module 106 imports the 3D mesh, captured color images and related pose information generated from the method 200 of FIG. 2 as input. An example of an input 3D mesh of an object—as generated by method 200 of FIG. 2—is shown in FIG. 4, and examples of related input color images are shown in FIGS. 5A-5C.

The image processing module 106 pre-processes the input color images to remove (302) blurry images from the collection of color images. To detect blurry images, the system first computes a blur metric for each image. An exemplary blur metric calculation is set forth in Crété-Roffet, Frédérique, et al., "The blur effect: perception and estimation with a new no-reference perceptual blur metric," *SPIE Electronic Imaging Symposium Conf Human Vision and Electronic Imaging*, Vol. 12 (2007), which is incorporated herein by reference. Generally, the blur metric depends upon how much change in intensity variation between neighboring pixels occurs when the image is blurred with a low-pass filter. If the input image is sharp, the effect of the low-pass filter is more noticeable than when the input image is already blurry. An image having a blur metric that is less than a specified threshold is considered sharp. Otherwise, the image is considered blurry and the image processing module 106 removes (302) the image from further post-processing steps.

The image processing module 106 also detects (304) textured regions in the images. For each color image, the module 106 classifies the pixels as either textured or non-textured. An exemplary classification methodology is described in Bergman, Ruth et al., "Detection of textured areas in images using a disorganization indicator based on component counts," HP Laboratories Israel HPL-2005-175 (R. 1) (2007), which is incorporated herein by reference. The module 106 utilizes the classification method to determine whether a pixel is textured on non-textured by counting the number of connected components in a local region around the pixel. In one embodiment, the module 106 stores a corresponding binary mask for each color image to specify whether each pixel in the related image is textured or non-textured.

The image processing module 106 also generates (306) an association between images and vertices. For this step, the module 106 generates a list of vertices per image which contains the vertices visible to that image, and a list of images per vertex which contains the images that include (or see) the vertex. The module 106 sorts the latter list by the angle between the sensor 103 viewing direction and the vertex normal.

For each input image, the module 106 projects the model onto the image plane using the captured pose information. The module 106 generates a z-buffer and uses the z-buffer to determine visible vertices in the image. During this step, the module 106 uses the texture masks (created from the earlier step) to classify (308) the vertices as either textured or non-textured. As follows:

Let:

$\mathcal{V} = \{v_i\}_{i=1 \ldots N}$ be the set of vertices in the model;

$\mathcal{N} = \{n_i\}_{i=1 \ldots N}$ be the set of vertex normals in the model, corresponding to $\mathcal{V}$;

$\mathcal{I} = \{I_k\}_{k=1 \ldots K}$ and $\mathcal{P} = \{(R_k, t_k)\}_{k=1 \ldots K}$ are the set of captured color images and the corresponding pose information;

$\mathcal{T} = \{T_k\}_{k=1 \ldots K}$ be the set of texture masks generated from the previous step, where 1 marks a textured pixel;

$\mathcal{IL} = \{IL_i\}_{i=1 \ldots N}$ be the set of image lists, one per vertex, that contain the images in which the vertex is visible;

$\mathcal{VL} = \{VL_k\}_{k=1 \ldots K}$ be the set of vertex lists, one per image, that contain the vertices visible in each image.

For k=1 . . . K:

Transform the model to the viewpoint of the image, using recording pose.

$$\mathcal{V}^{(k)} = R_k \mathcal{V} + t_k$$

$$\mathcal{N}^k = R_k \mathcal{N}$$

Project the transformed model $\mathcal{V}^{(k)}$ onto the corresponding image plane to create the depth buffer $D_k$, using a standard rasterization algorithm;

Project each vertex $\mathcal{V}_i^{(k)}$ onto the image plane at location (u, v). Compare the z-coordinate of $\mathcal{V}_i^{(k)}$ with $D_k(u, v)$. If the depth of $\mathcal{V}_i^{(k)}$ is greater, i.e. the point is not visible in this image, continue with the next vertex;

Look at points in a neighborhood around (u, v). If there is a discontinuity in depth (e.g. a depth difference greater than 5 cm), $\mathcal{V}_i^{(k)}$ is considered an edged vertex and is skipped. Also, the corresponding location in the texture mask $T_k$ is cleared;

Compute the cosine of the angle between normal vector $n_i^{(k)}$ and viewing direction. If the cosine is greater than 0, i.e. the vertex normal points away from the sensor, skip this vertex;

Update $VL_k$ and $IL_i$. Each element of $IL_i$ contains the cosine of the angle and the texture indicator for the pixel in the corresponding texture mask $T_k$.

After processing all of the images, the image processing module 106 sorts the image lists in $\mathcal{IL}$ by increasing angle between the vertex's normal and the viewing direction. For each vertex, the module 106 computes the probability of the vertex being textured, by averaging the probability in the corresponding images, and then classifying the vertex as being either textured or non-textured.

Next, the image processing module 106 optimizes (310) the captured poses by minimizing a cost function, as follows:

Let $\mathcal{C} = \{c_i\}_{i=1 \ldots N}$ be the set of colors of all the vertices. Each color $c_i$ is a vector with 3 components:

$$c_i = [c_{i,R} c_{i,G} c_{i,B}]^T$$

Let $\Gamma_k(v_i, R_k, t_k)$ denote the operation of projecting $v_i$ onto image $I_k$, using the current pose $(R_k, t_k)$, and looking up the color;

Let $m_i$ be the texture indicator for vertex $v_i$: $m_i=1$ if $v_i$ is textured and $m_i=0$ if $v_i$ is non-textured.

The cost function J is divided into two components. The first component $J_1$ enforces the consistency with the captured data:

$$J_1(C, \mathcal{P}) = \frac{1}{2} \sum_{i=1}^{N} \sum_{k \in IL_i(m_i)} \|c_i - \Gamma_k(v_i, R_k, t_k)\|^2$$

where $IL_i(m_i)$ denotes the set of top-most images from $IL_i$ being used for vertex $v_i$. The number of images in this set depends on whether $v_i$ is textured or non-textured. The module 106 uses a higher number of images for non-textured vertices to smooth out the color changes in difference images due to lighting condition and viewing angle.

The second component $J_2$ enforces the smoothness of the recovered color for non-textured vertices:

$$J_2(C) = \frac{1}{2} \sum_{i=1}^{N} \sum_{i' \in N(i)} (1 - m_i m_{i'}) \|c_i - c_{i'}\|^2$$

where N(i) denotes the index set of neighboring vertices of $v_i$.

The overall cost function to minimize is:

$$J(\mathcal{N}, \mathcal{P}) = J_1(\mathcal{N}, \mathcal{P}) + \lambda J_2(\mathcal{N})$$

To minimize the above cost function, the module 106 alternatively updates the poses and the color of the vertices.

To update the color of the vertices, the module 106 uses a gradient descent methodology, as follows:

$$\mathcal{C}^{(l+1)} = \mathcal{C}^{(l)} - \mu \nabla_{\mathcal{C}} J(\mathcal{C}, \mathcal{P})|_{\mathcal{C}^{(l)}}$$

where:

$\mathcal{C}^{(l+1)}$, $\mathcal{C}^{(l)}$ are N×3 matrices containing the colors of the vertices;

$\nabla_{\mathcal{C}} J(\mathcal{C}, \mathcal{P})|_{\mathcal{C}^{(l)}}$ is the gradient matrix of $J(\mathcal{C}, \mathcal{P})$, evaluated from current poses and color of vertices.

Upon fixing the color of the vertices, the module 106 optimizes the poses independently for each image, using a Gauss-Newton method:

Let $r_{i,k} = c_i - \Gamma_k(v_i, p_k)$. $r_{i,k}$ be a 3×1 residual vector, which is the difference between the current vertex's color and the color of that vertex looked up from the image. Since color is fixed, only $J_1(\mathcal{C}, \mathcal{P})$ is considered in this step.

$J_1(\mathcal{C}, \mathcal{P})$ can be rewritten as:

$$J_1(C, \mathcal{P}) = \frac{1}{2} \sum_{i=1}^{N} \sum_{k \in IL_i(m_i)} \|r_{i,k}\|^2$$

$$= \frac{1}{2} \sum_{k=1}^{K} \sum_{i \in VL_k} \|r_{i,k}\|^2$$

Thus, it is possible to optimize the pose of each image independently. The cost function for $k^{th}$ image is:

$$J_1^{(k)}(R_k, t_k) = \sum_{i \in VL_k} \|r_{i,k}\|^2$$

The pose $(R_k, t_k)$ is parameterized by locally linearizing around the current pose $(R_k^{(l)}, t_k^{(l)})$ from the previous iteration as follows:

$$R_k \approx \begin{bmatrix} 1 & -\gamma_k & \beta_k & a_k \\ \gamma_k & 1 & -\alpha_k & b_k \\ -\beta_k & \alpha_k & 1 & c_k \\ 0 & 0 & 0 & 1 \end{bmatrix} \begin{bmatrix} R_k^{(l)} & t_k^{(l)} \\ 0 & 1 \end{bmatrix}$$

Let $x_k$ be the 6×1 parameter vector representing the pose $(R_k, t_k)$:

$$x_k = [\alpha_k \beta_k \gamma_k a_k b_k c_k]^T$$

The Gauss-Newton update is written as:

$$x_k^{(l+1)} = x_k^{(l)} + \Delta x_k^{(l)}$$

where $\Delta x_k^{(l)}$ is the solution of the linear system:

$$A \Delta x_k^{(l)} = b$$

The matrices A and b are computed as follows:

$$A = \sum_{i \in VL_k} [(\nabla_x r_{i,k})^T \nabla_x r_{i,k}]_{x_k^{(l)}}$$

$$b = -\sum_{i \in VL_k} [(\nabla_x r_{i,k})^T r_{i,k}]_{x_k^{(l)}}$$

These derivatives can be computed using, e.g., a chain rule.

Returning to FIG. 3, the image processing module 106 segments the input 3D mesh. In this step, the module 106 assigns corresponding texture coordinates to each vertex, which allows the module 106 to look up its color from a texture atlas. First, the module 106 segments (312) the 3D mesh into regions isomorphic to a disk, which can be flattened into 2D without significant distortion. Then, the module 106 parameterizes (314) the regions so that each vertex inside it has 2D texture coordinates. This step essentially flattens the segments onto a 2D atlas.

In one exemplary implementation, the image processing module 106 uses an open source library UVAtlas (available from https://github.com/Microsoft/UVAtlas), which implements an iso-chart texture atlasing algorithm as described in Zhou, Kun, et al. "Iso-charts: stretch-driven mesh parameterization using spectral analysis," *Proceedings of the 2004 Eurographics/ACM SIGGRAPH symposium on Geometry processing*, ACM (2004), which is incorporated herein by reference.

The image processing module 106 then paints (316) the texture atlas using the captured color images and their corresponding optimized poses, as follows:

For each face (triangle) in the mesh:
Get the indices $\{i_1, i_2, i_3\}$ of the 3 corner vertices;
Get 3D coordinates $\{v_{i_1}, v_{i_2}, v_{i_3}\}$ and texture coordinates $\{p_{i_1}, p_{i_2}, p_{i_3}\}$ of 3 corner vertices and get the 3 corresponding normal vectors $\{n_{i_1}, n_{i_2}, n_{i_3}\}$;
Merge 3 image lists $\{IL_{i_1}, IL_{i_2}, IL_{i_3}\}$ corresponding to 3 vertices and sort the merged list based on the angle between the face's normal vector and the viewing angle;
For each textel p inside the triangle formed by the 3 texture coordinates (in the texture atlas), compute the 3D coordinates v and normal vector n by barycentric interpolation from those of the corner vertices.

$v=\text{barycentric\_interpolate}(v_{i_1}, v_{i_2}, v_{i_3})$ $n=\text{barycentric\_interpolate}(n_{i_1}, n_{i_2}, n_{i_3})$ For each image $l_k$ in the first N images of the merged image list, project v onto the image, using the optimized pose $\{R_k, t_k\}$ and obtain the color from the projected pixel in the color image. N is a parameter which is predetermined.
The final color of the corresponding textel is determined by a weighting scheme so as to provide a smooth and clean model.

Figure 6A:
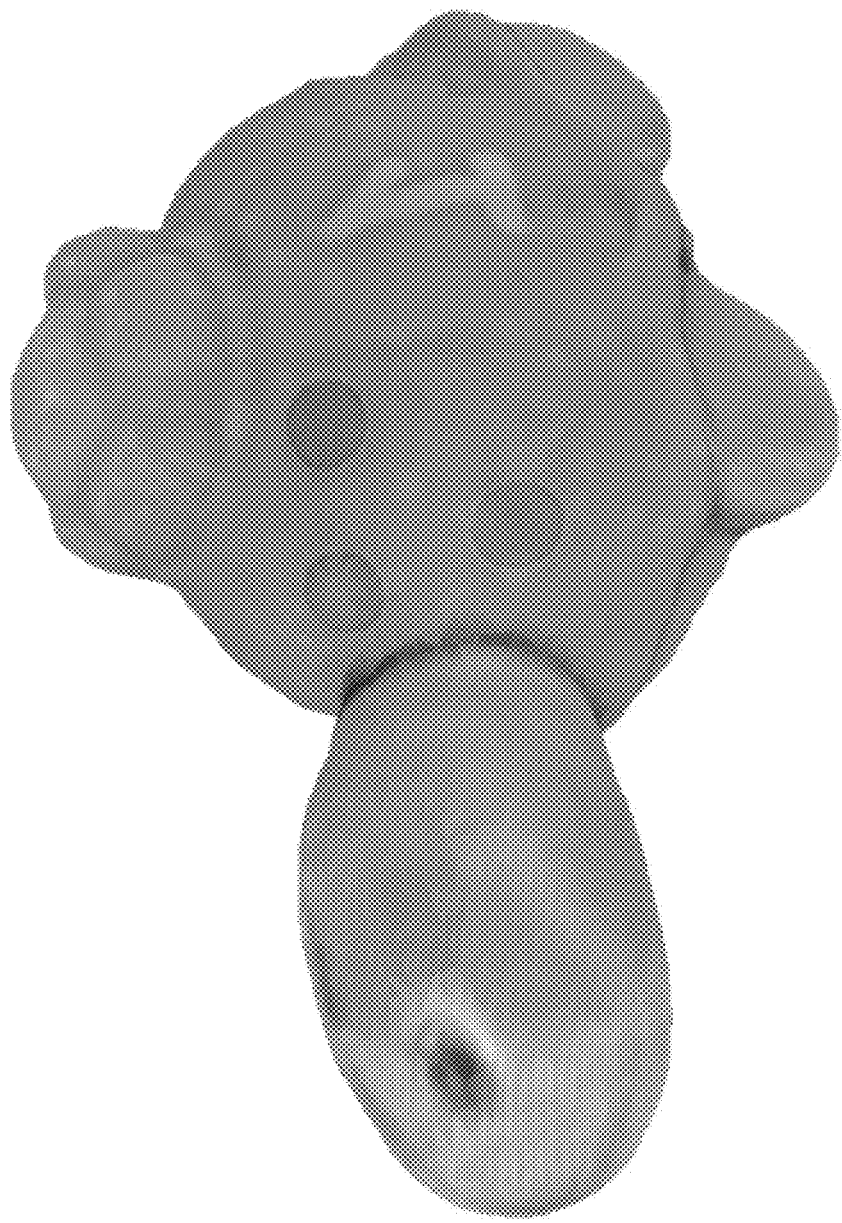
FIG. 6A is an exemplary fully textured 3D model.
Figure 6B:
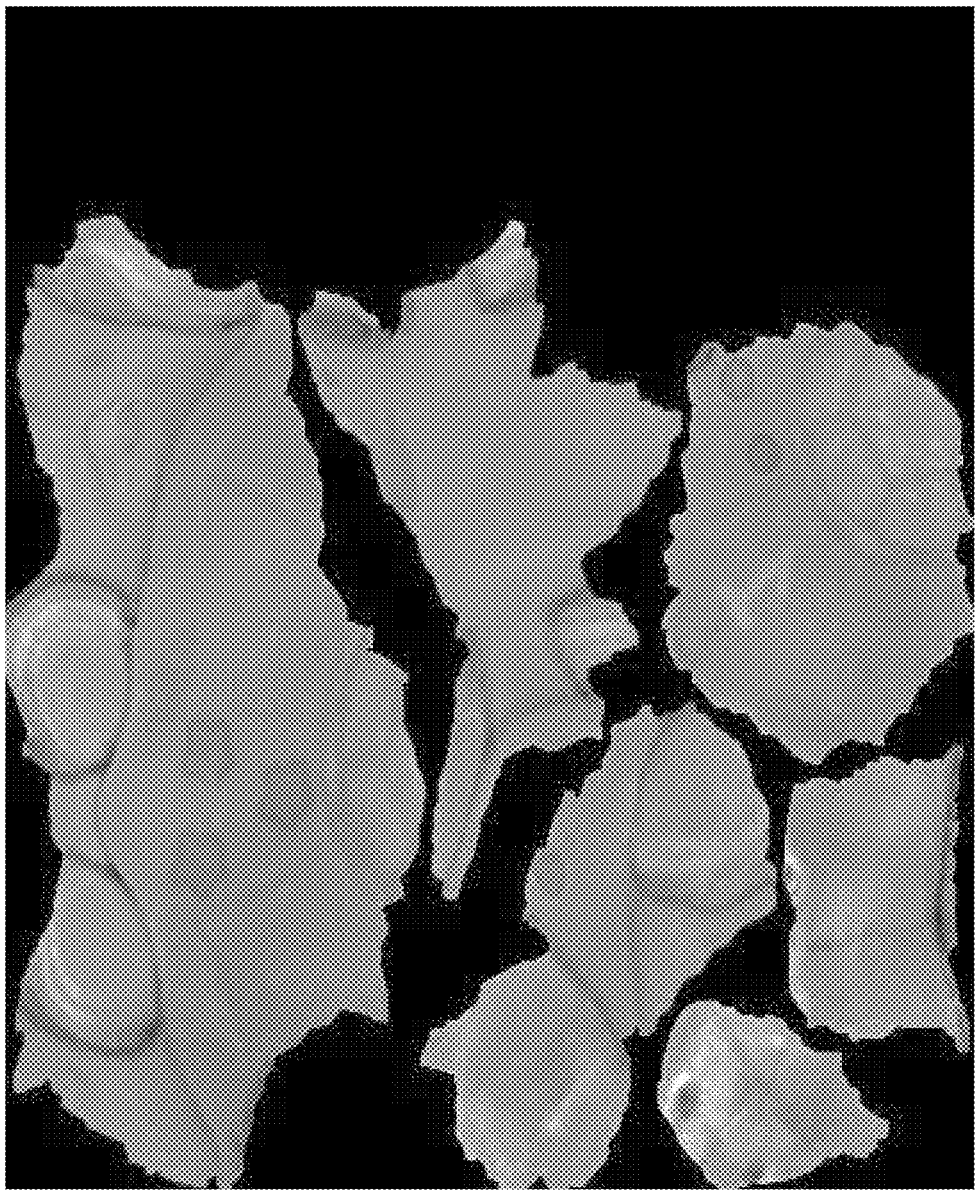
FIG. 6B is the corresponding texture atlas used to paint the exemplary 3D model.

After the image processing module 106 has painted the texture atlas, the module 106 generates the output as shown in FIGS. 6A and 6B. FIG. 6A is a fully textured 3D model and FIG. 6B is the corresponding texture atlas used to paint the 3D model.

In addition, the techniques described above are applicable in the context of capturing very high-resolution (also called HD) color images (e.g., 14 megapixel resolution) along with the pose relative to a 3D object, and overlaying the HD images onto the 3D object. As mentioned above, there may be errors in the reconstructed 3D model and the relative HD pose accuracy. Therefore, the texture from multiple HD images may not line up exactly when projected onto the 3D model.

Figure 7:
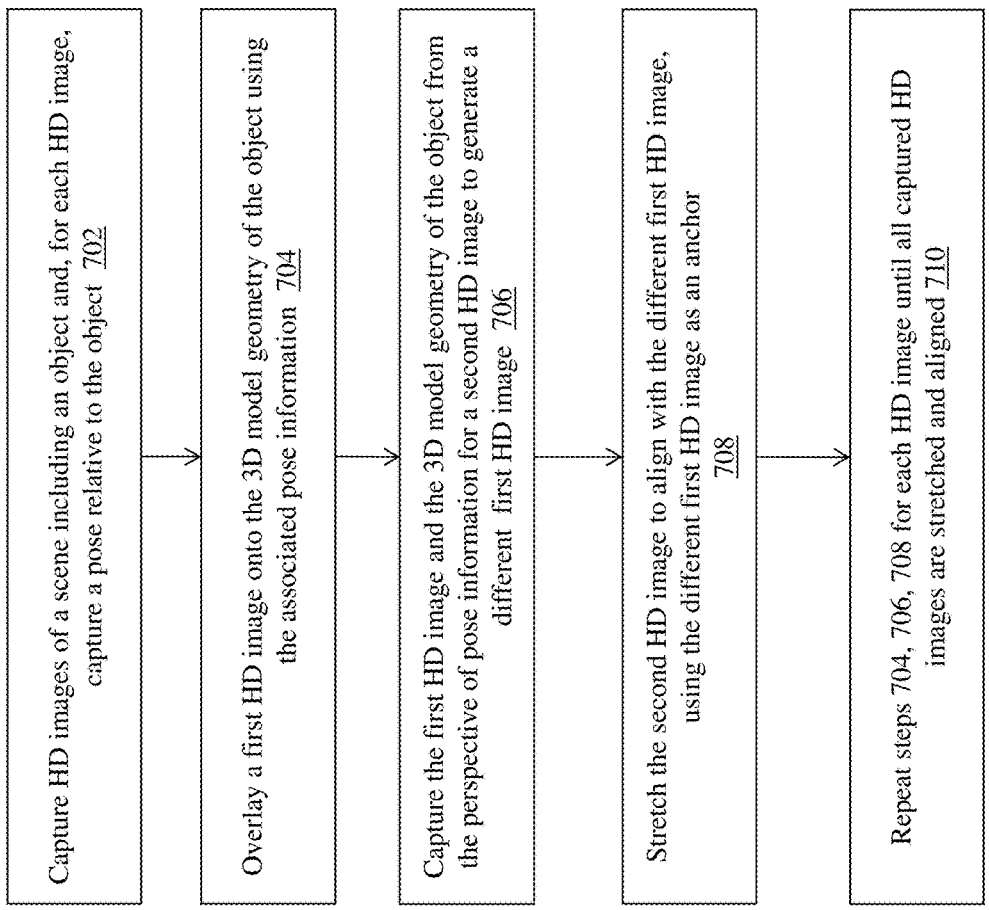
FIG. 7 is a flow diagram of a method of capturing 3D scans of an object in conjunction with HD color images of the object.

In order to overcome this challenge, the system 100 implements a process to improve the alignment of multiple HD images projected onto a 3D object. FIG. 7 is a flow diagram of a method 700 of capturing 3D scans of an object in conjunction with HD color images of the object, using the system 100 of FIG. 1. As shown in FIG. 7, the sensor 103 captures (702) HD images of a scene 101 which includes object 102a. The sensor 103 also captures (702), for each HD image, a pose relative to the object 102a. For example:

HDimage(1)+pose(1),HDimage(2)+pose(2), . . . ,HDimage(i)+pose(i)

Using the generated 3D mesh (as described above), the image processing module 106 overlays (704) the first HD image (e.g., HDimage(1)) onto the 3D model geometry of the object using the associated pose information (e.g., pose (1)). Using the projection of the first HD image onto the 3D model, the image processing module 106 then captures (706) the HD image HDimage(1) and the 3D model geometry from the perspective of pose(2)—resulting in a different HD image→HDimage(1)'. Next, the image processing module 106 stretches (708) the second HD image HDimage(2) to align with HDimage(1)', using HDimage(1)' as an anchor. An exemplary algorithm for stretching the HD images as described above is a panoramic image stretching function—for example, as described in J. Zaragoza et al., "As-Projective-As-Possible Image Stitching with Moving DLT," IEEE Transactions on Pattern Analysis and Machine Intelligence (Vol. 36, Issue 7), pp. 1285-1298, July 2014, which is incorporated herein by reference. Such panoramic image creation algorithms are adaptable to 3D model photogrammetry as described herein.

Once the image processing module 106 has stretched HDimage(2) to align with HDimage(1)', the module 106 repeats (710) the above steps 704, 706, 708 for each subsequent HD image until all of the captured HD images are stretched and aligned with each other. For example:

The module 106 overlays HDimage(2) onto the 3D model geometry using pose(2);
The module 106 captures HDimage(2) and the 3D model geometry from the perspective of pose(3)—resulting in a different HD image HDimage(2)';
The module 106 stretches HDimage(3) to align with HDimage(3)', using HDimage(3)' as an anchor;
and so forth, until all HD images have been processed.

Figure 8A:
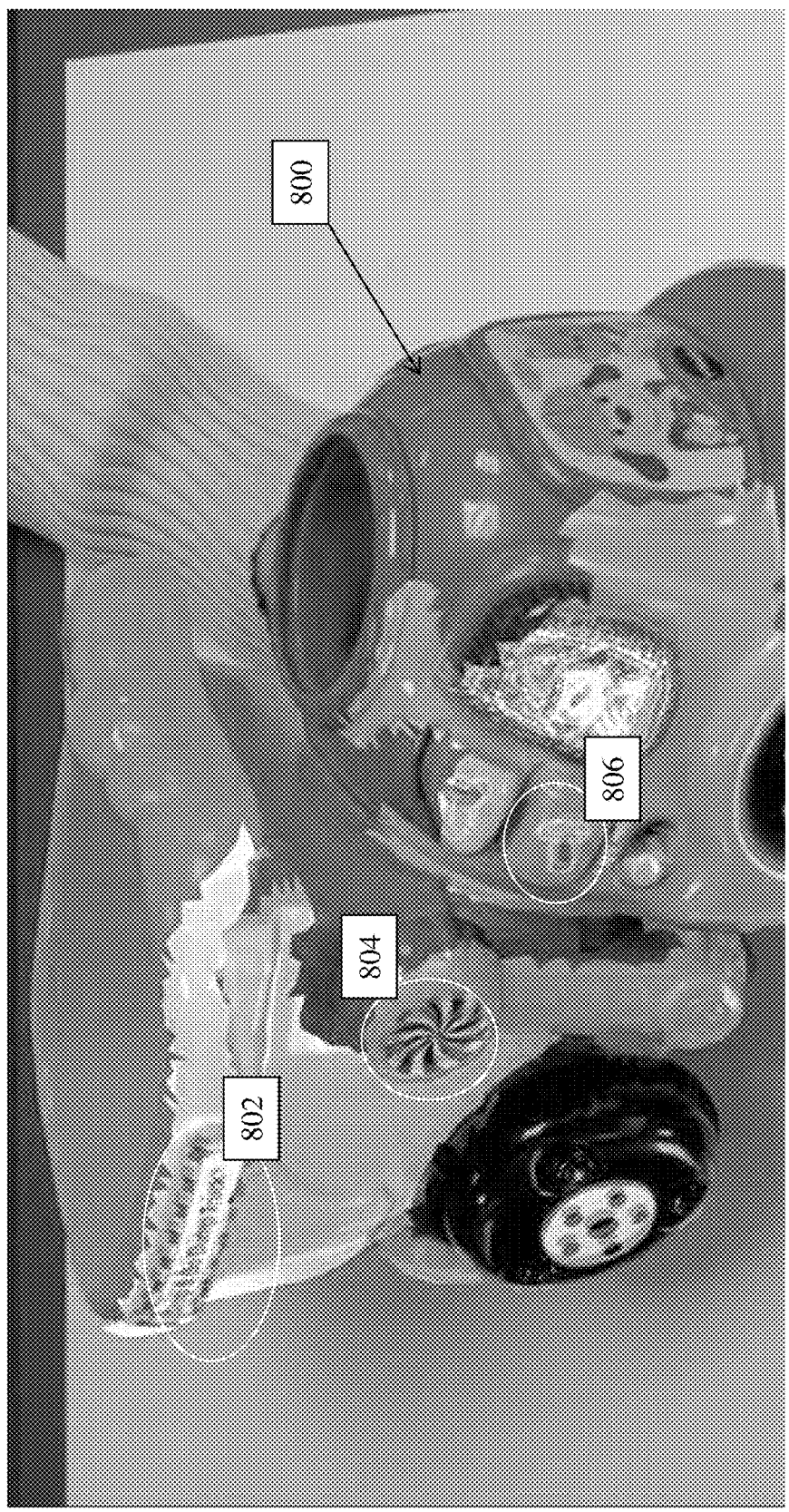
FIG. 8A is an exemplary object onto which HD color images have been overlaid but not aligned.

FIG. 8A is an exemplary object 800 (e.g., a toy truck) onto which HD color images have been overlaid, as described above, but not yet aligned using the method of FIG. 7. As shown in FIG. 8A, the HD color images have been overlaid on the 3D geometry of the object 800. However, the HD images are not aligned—resulting in multiple areas of the object 800 that appear blurry and/or misaligned (e.g., areas 802, 804, 806, among others).

Figure 8B:
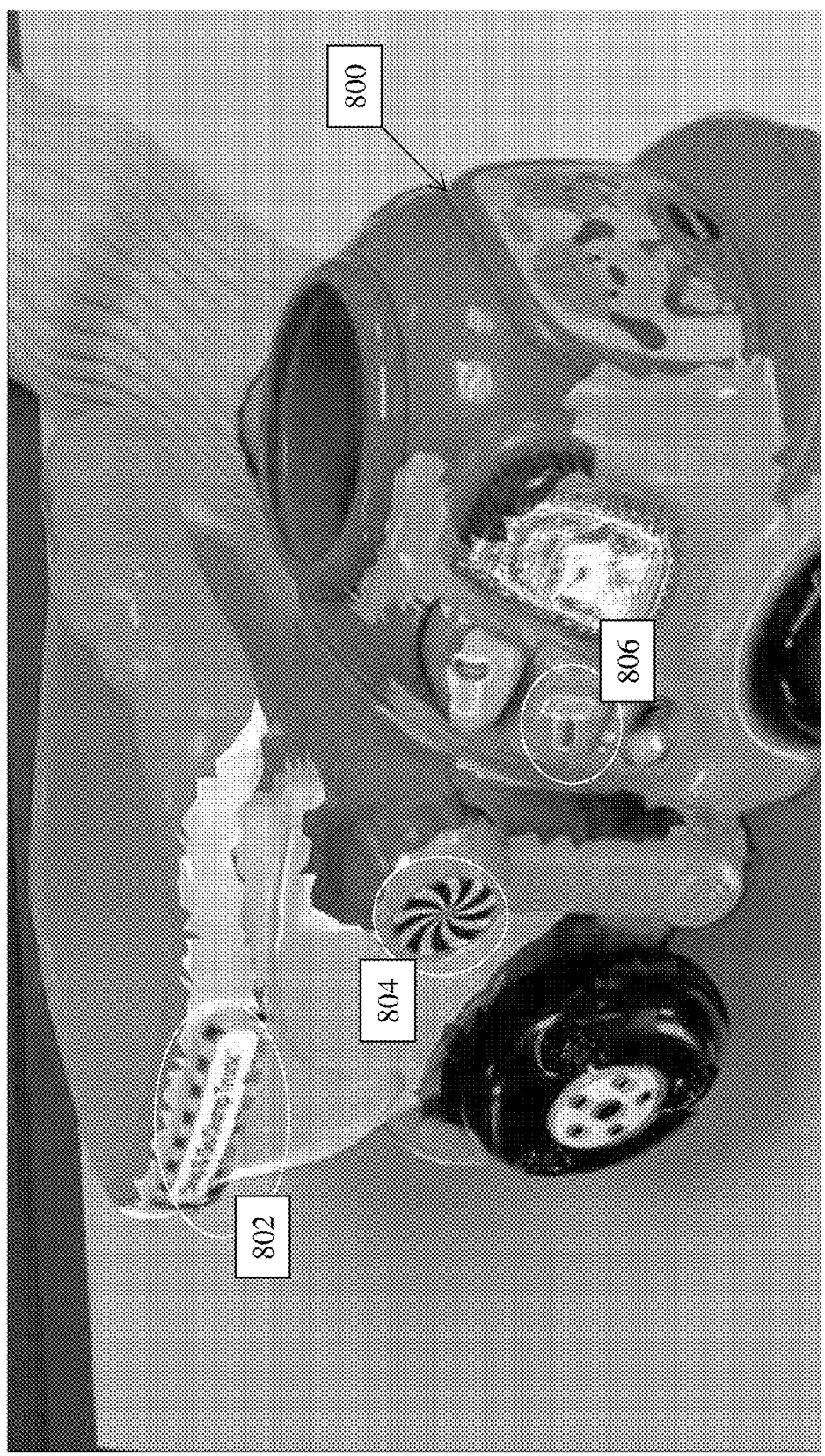
FIG. 8B is an exemplary object onto which HD color images have been overlaid and aligned.

FIG. 8B is the object 800 onto which HD color images have been overlaid and aligned using the method of FIG. 7. As shown in FIG. 8B, the HD color images are overlaid on the 3D geometry of the object 800 and aligned—resulting in the areas 802, 804, 806 appearing substantially aligned and providing a much clearer projection of the HD images onto the object 800.

As can be appreciated, the methods, systems, and techniques described herein are applicable to a wide variety of useful commercial and/or technical applications. Such applications can include:

Augmented Reality—to capture, track, and paint real-world objects from a scene for representation in a virtual environment;
3D Printing—real-time dynamic three-dimensional (3D) model reconstruction with occlusion or moving objects as described herein can be used to create and paint a 3D model easily by simply rotating the object by hand and/or via a manual device. The hand (or turntable), as well as other non-object points, are simply removed in the background while the surface of the object is constantly being updated with the most accurate points extracted from the scans. The methods and systems described herein can also be in conjunction with higher-resolution lasers or structured light scanners to track object scans in real-time to provide accurate tracking information for easy merging of higher-resolution scans.

Entertainment—For example, augmented or mixed reality applications can use real-time dynamic three-dimensional (3D) model reconstruction with occlusion or moving objects as described herein to dynamically create and paint 3D models of objects or features, which can then be used to super-impose virtual models on top of real-world objects. The methods and systems described herein can also be used for classification and identification of objects and features. The 3D models can also be imported into video games.

Parts Inspection—real-time dynamic three-dimensional (3D) model reconstruction with occlusion or moving objects as described herein can be used to create and paint a 3D model which can then be compared to a reference CAD model to be analyzed for any defects or size differences.

E-commerce/Social Media—real-time dynamic three-dimensional (3D) model reconstruction with occlusion or moving objects as described herein can be used to easily model humans or other real-world objects which are then imported into e-commerce or social media applications or websites.

Other applications—any application that requires 3D modeling or reconstruction can benefit from this reliable method of extracting just the relevant object points and removing points resulting from occlusion in the scene and/or a moving object in the scene.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for texturing a three-dimensional (3D) model using photogrammetry, the method comprising:
    capturing, by a 3D sensor coupled to a computing device, one or more 3D scans of a physical object in a scene, including related pose information of the object, and one or more color images corresponding to each 3D scan;
    generating, by a computing device, a 3D mesh of the physical object using the 3D scans and pose information;
    preprocessing, by the computing device, the color images to remove blurry images and to detect textured regions of the object in each non-blurry image;
    optimizing, by the computing device, the pose information for each color image by generating associations between the color images and vertices in the 3D mesh and classifying the vertices as textured or non-textured;
    generating, by the computing device, texture coordinates for the 3D mesh by segmenting the 3D mesh, parameterizing the segments, and packing the parameterized segments into a texture atlas; and
    painting, by the computing device, the texture atlas using the color images that have optimized pose information to generate a 3D model having texture coordinates for each vertex.

2. The method of claim 1, wherein the step of capturing one or more 3D scans of a physical object in a scene comprises one or more of: bilateral filtering of the one or more 3D scans to remove noise; downsampling the one or more 3D scans to generate an image pyramid at different scales; converting the one or more 3D scans to 3D point clouds and estimating the normal vector for each vertex in the point clouds; and cropping points outside the scan volume.

3. The method of claim 1, wherein the step of capturing one or more 3D scans of a physical object in a scene comprises, for each of the one or more 3D scans:
    registering, by the computing device, the 3D scan to a current volumetric model of the object;
    updating, by the computing device, the current volumetric model based upon a current pose of the object in the 3D scan;
    determining, by the computing device based upon the current pose, whether the object has rotated more than a specified threshold from a previous pose; and
    capturing, by the computing device, a high-resolution color image of the object and a pose of the object when the object has rotated more than the specified threshold.

4. The method of claim 1, wherein the step of preprocessing the color images to remove blurry images comprises:
    generating, by the computing device, a blur metric for each color image;
    determining, by the computing device, whether the blur metric is below a predetermined threshold; and
    removing, by the computing device, the color image when the blur metric is below the predetermined threshold.

5. The method of claim 4, wherein the step of preprocessing the color images to detect textured regions of the object comprises:
    classifying, by the computing device, pixels in each non-blurry color image as textured or non-textured; and
    generating, by the computing device, a binary mask for each non-blurry color image that specifies whether each pixel in the image is textured or non-textured.

6. The method of claim 1, wherein the step of generating associations between the color images and vertices in the 3D mesh comprises:
    generating, by the computing device, a first list of vertices per color image, wherein the first list comprises vertices visible in the color image; and
    generating, by the computing device, a second list of images per vertex, wherein the second list comprises images that include the vertex.

7. The method of claim 6, wherein the step of optimizing the pose information for each color image comprises minimizing, by the computing device, a cost function.

8. The method of claim 7, wherein the step of minimizing the cost function comprises alternately updating, by the computing device, a pose of each vertex and a color of each vertex.

9. The method of claim 1, wherein the step of segmenting the 3D mesh comprises segmenting, by the computing device, the 3D mesh into regions isomorphic to a disk.

10. The method of claim 9, wherein the step of parameterizing the segments comprises assigning, by the computing device, 2D texture coordinates to each vertex inside each region.

11. The method of claim 1, further comprising:
overlaying, by the computing device, a first one of the captured color images onto the 3D mesh of the object using the pose information of the 3D scan corresponding to the color image;
generating, by the computing device, a different first color image by capturing the first color image and a geometry of the 3D mesh from a perspective of the pose information of the 3D scan corresponding to a second one of the captured color images;
stretching, by the computing device, the second color image to align with the different first color image, using the different first color image as an anchor; and
repeating, by the computing device, the overlaying step, the generating a different color image step, and the stretching step for each of the captured color images until all of the captured color images are aligned.

12. A system for texturing a three-dimensional (3D) model using photogrammetry, the system comprising:
a 3D sensor coupled to a computing device that captures one or more 3D scans of a physical object in a scene, including related pose information of the object, and one or more color images corresponding to each 3D scan; and
the computing device that:
generates a 3D mesh of the physical object using the 3D scans and pose information;
preprocesses the color images to remove blurry images and to detect textured regions of the object in each non-blurry image;
optimizes the pose information for each color image by generating associations between the color images and vertices in the 3D mesh and classifying the vertices as textured or non-textured;
generates texture coordinates for the 3D mesh by segmenting the 3D mesh, parameterizing the segments, and packing the parameterized segments into a texture atlas; and
paints the texture atlas using the color images that have optimized pose information to generate a 3D model having texture coordinates for each vertex.

13. The system of claim 12, wherein capturing one or more 3D scans of a physical object in a scene comprises one or more of: bilateral filtering of the one or more 3D scans to remove noise; downsampling the one or more 3D scans to generate an image pyramid at different scales; converting the one or more 3D scans to 3D point clouds and estimating the normal vector for each vertex in the point clouds; and cropping points outside the scan volume.

14. The system of claim 12, wherein capturing one or more 3D scans of a physical object in a scene comprises, for each of the one or more 3D scans:
registering the 3D scan to a current volumetric model of the object;
updating the current volumetric model based upon a current pose of the object in the 3D scan;
determining, based upon the current pose, whether the object has rotated more than a specified threshold from a previous pose; and
capturing a high-resolution color image of the object and a pose of the object when the object has rotated more than the specified threshold.

15. The system of claim 12, wherein preprocessing the color images to remove blurry images comprises:
generating a blur metric for each color image;
determining whether the blur metric is below a predetermined threshold; and
removing the color image when the blur metric is below the predetermined threshold.

16. The system of claim 15, wherein preprocessing the color images to detect textured regions of the object comprises:
classifying pixels in each non-blurry color image as textured or non-textured; and
generating a binary mask for each non-blurry color image that specifies whether each pixel in the image is textured or non-textured.

17. The system of claim 15, wherein generating associations between the color images and vertices in the 3D mesh comprises:
generating a first list of vertices per color image, wherein the first list comprises vertices visible in the color image; and
generating a second list of images per vertex, wherein the second list comprises images that include the vertex.

18. The system of claim 17, wherein optimizing the pose information for each color image comprises minimizing a cost function.

19. The system of claim 18, wherein minimizing the cost function comprises alternately updating a pose of each vertex and a color of each vertex.

20. The system of claim 12, wherein segmenting the 3D mesh comprises segmenting the 3D mesh into regions isomorphic to a disk.

21. The system of claim 20, wherein parameterizing the segments comprises assigning 2D texture coordinates to each vertex inside each region.

22. The system of claim 12, wherein the computing device:
overlays a first one of the captured color images onto the 3D mesh of the object using the pose information of the 3D scan corresponding to the color image;
generates a different first color image by capturing the first color image and a geometry of the 3D mesh from a perspective of the pose information of the 3D scan corresponding to a second one of the captured color images;
stretches the second color image to align with the different first color image, using the different first color image as an anchor; and
repeats the overlaying step, the generating a different color image step, and the stretching step for each of the captured color images until all of the captured color images are aligned.

* * * * *